United States Patent [19]

van den Steen

[11] Patent Number: 4,674,010
[45] Date of Patent: Jun. 16, 1987

[54] CAPACITIVE SUBMERGIBLE ELECTRICAL CONNECTOR APPARATUS

[75] Inventor: Leon van den Steen, Rijswijk, Netherlands

[73] Assignee: Shell Oil Company, Houston, Tex.

[21] Appl. No.: 862,926

[22] Filed: May 14, 1986

Related U.S. Application Data

[63] Continuation-in-part of Ser. No. 821,520, Jan. 23, 1986, abandoned, which is a continuation-in-part of Ser. No. 761,118, Jul. 31, 1985, abandoned.

[30] Foreign Application Priority Data

Jan. 17, 1985 [GB] United Kingdom ................ 8501155

[51] Int. Cl.$^4$ ............................................. H01G 9/00
[52] U.S. Cl. .................................................. 361/433
[58] Field of Search .......... 361/327, 178, 284, 433 M, 361/433 E, 433 L

[56] References Cited

U.S. PATENT DOCUMENTS

| | | | |
|---|---|---|---|
| 2,264,130 | 11/1941 | Compton | 361/433 |
| 2,555,326 | 6/1951 | Doughty | 361/327 |
| 2,709,781 | 5/1955 | Douty et al. | 361/433 |
| 3,335,344 | 8/1967 | Kling | 361/284 |
| 3,558,908 | 1/1971 | Kulikov et al. | 361/327 X |
| 4,337,501 | 6/1982 | Mund et al. | 361/433 |

Primary Examiner—Donald A. Griffin

[57] ABSTRACT

A capacitive electrical connector apparatus for electrical signal or power coupling in a submerged environment. The connector consists of a first member and a second member disposed adjacent one another which are adapted for mechanical mating. Each member comprises an electrode, the electrodes being located opposite to one another and each provided with a dielectric layer at its surface directed to the surface of the other electrode. The electrodes are adapted to be connected electrically to respective installation parts to be capacitively coupled. The first and second members mate mechanically in such a way that a cavity remains between the electrodes. When submerged, the cavity is filled with a conductive fluid such as seawater, or, for example, an aqueous drilling fluid.

19 Claims, 1 Drawing Figure

CAPACITIVE SUBMERGIBLE ELECTRICAL CONNECTOR APPARATUS

RELATED APPLICATION

This application is a continuation-in-part of application Ser. No. 821,520 filed on Jan. 23, 1986 now abandoned. Application Ser. No. 821,520 is a continuation of application Ser. No. 761,118, filed July 31, 1985, now abandoned.

BACKGROUND OF THE INVENTION

The invention relates to a submergible electrical connector, based upon capacitive coupling. The electrical connector may be used underwater or, for example, in an aqueous drilling fluid environment.

DESCRIPTION OF THE PRIOR ART

Under certain conditions in oil and gas production, for example marginal fields, extreme hostile sea conditions, large water depth, widely extending formations, etc., a part of the production installation can be located on the sea-bed. Then typically wellheads and pipeline manifolds are applied as subsea installations.

Currently the trend in subsea installations is towards "wet completions" which implies that the equipment is exposed to sea water.

Systems have been developed for monitoring and controlling subsea installations. The demand on such systems is increasing when the installations are more complex, for example a number of wells producing in one sea-bed flowline or when installation is done beyond the generally accepted diving depth.

Subsea control systems may have a rather poor performance due to failing electrical interconnections between the sensors and actuators of these systems and the surface-mounted system parts.

The present invention relates, in particular, to a solution for these interconnecting problems, not only in underwater applications, but also in any fluid environment where it is desired to transmit signals or electric power through electrical interconnections.

Submergible electrical make-and-break connectors, such as, for example, required in electro-hydraulic control systems for subsea installations, or required in down-hole well drilling telemetry equipment, have up till now been based either on the conventional pin and bus principle or on inductive coupling.

On the basis of reliability considerations the latter option is preferred in many modern subsea or drilling telemetry systems.

However, inductive couplers still have various disadvantages. Inductive couplers for the transmission of power (for example 1 kVA) are rather bulky. Due to their construction they generally possess a poor power factor, which deteriorates the total system efficiency substantially when interconnected in more than, say, four levels.

Moreover, due to the requirement that during the lifetime of subsea equipment of, say, 25 years no water should enter the electric or magnetic parts, the construction is critical and consequently expensive.

Apart from the disadvantage of large size inductive signal couplers share the disadvantages of power couplers.

Moreover their relatively low impedance at high frequencies prohibits the transmission of high frequency signals (for example 100 kHz) from high impedance sources such as a piezo-electric crystal or a capacitive sensor.

SUMMARY OF THE INVENTION

It is therefore an object of the invention to provide a submergible electrical connector for electric signal or power transmission between installation parts to be coupled electrically, based upon capacitive coupling, which offers good characteristics both for power and signal applications.

It is another object of the invention to provide a simple, cheap and highly reliable fluid tolerant capacitive submergible connector.

It is still another object of the invention to provide a capacitive submergible connector having a high tolerance to misalignment and gap and having negligible cooling problems.

It is still another object of the invention to provide a capacitive submergible connector adapted to transmit signals of virtually unlimited upper frequency.

The invention therefore provides a capacitive electrical make-and-break connector for electrical signal or power coupling in a submerged environment, the connector consisting of a first member and a second member disposed adjacent one another and adapted for mechanical mating, wherein each member includes an electrode, each of the electrodes being located opposite to one another and each provided with a dielectric layer at its surface directed to the surface of the other electrode, and wherein the electrodes are adapted to be connected electrically to respective submerged installation parts to be capacitively coupled, and wherein the first and second members mate mechanically in such a way that a cavity remains between the electrodes, the cavity being insulated from its fluid environment and wherein, when submerged, the cavity is filled with the fluid.

As already indicated earlier, the electrical coupler of the invention has been based upon the principle of capacitive coupling of electrical circuits.

The theory of capacitive coupling as such is known to those skilled in the art and will not be described in further detail.

BRIEF DESCRIPTION OF THE DRAWING

The invention will now be described by way of example in more detail by reference to the accompanying drawing, in which FIG. I represents schematically the capacitive connector of the invention.

DESCRIPTION OF THE PREFERRED EMBODIMENT

Figure 1:
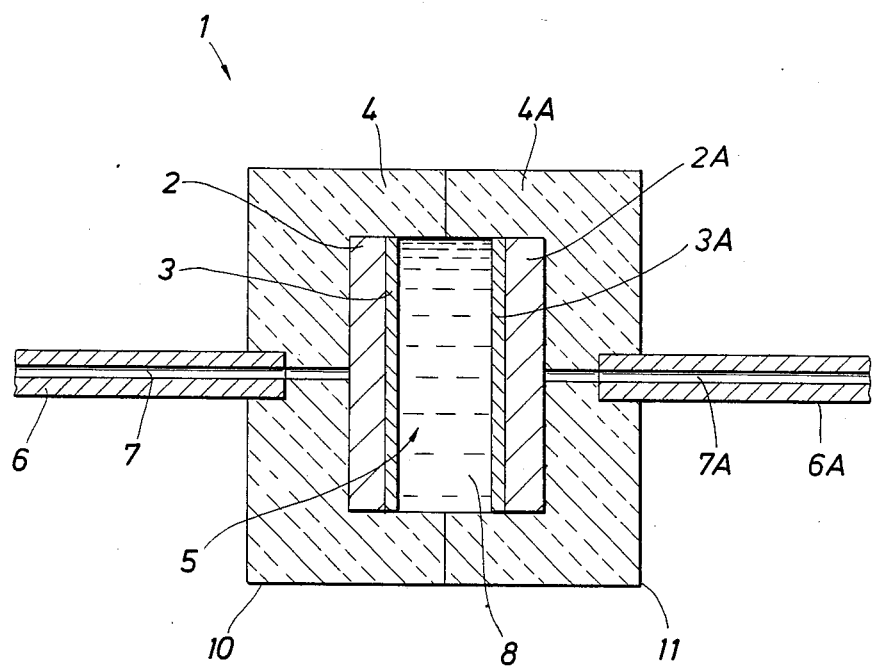

Referring now to Figure I a capacitive electrical submergible connector apparatus 1 has been represented.

The connector apparatus 1 comprises a first member 10 and a second member 11 which are adapted for mechanical mating. Each said member 10, 11 includes an electrode 2, 2A respectively which are located opposite to one another. The electrodes 2, 2A may, for example, be metal plates.

The electrodes 2, 2A are covered with a dielectric layer 3, 3A respectively at their respective sides which are directed to one another.

The first and second members 10, 11 which, for example, can be made of insulating material 4, 4A, mate mechanically in such a way that a cavity 5, completely or for the major part insulated from its fluid environment, remains between the electrodes 2, 2A.

When submerged, the cavity 5 is filled with a conductive fluid 8 such as sea water or drilling fluid or any other fluid having a conductivity greater than 1.0 mho/meter, in order for the apparatus 1 to operate properly.

The members 10, 11 are provided with any means 6, 6A respectively, suitable for connecting these members 10, 11 to the respective installation parts to be coupled capacitively (not shown for reasons of clarity). It is well understood that these installation parts may be located in the submerged environment with the electrical connector, or alternatively these installation parts may be located outside of the fluid that the electrical connector apparatus 1 is submerged in.

These means 6, 6A comprise electrical connections 7, 7A respectively for connecting the electrodes 2, 2A respectively to suitable electric parts of the installations to be connected electrically.

The dielectric layers 3, 3A may consist of any suitable material of good dielectric properties.

In advantageous embodiments of the invention materials such as Hastelloy-C, Monel, Inconel or titanium are used. Hastelloy-C, Inconel and Monel are metal-alloys, the compositions of which are known to those skilled in the art and will not be described in further detail.

These materials, when exposed to an oxidizing environment, like sea water or drilling fluids, develop a thin oxide skin which can be used as a dielectric layer, 3, 3A.

In advantageous embodiments of the invention the layers 3, 3A have a thickness in the 0.3-10 nm range and each plate 2, 2A may have an area varying from 1 cm$^2$ (for example for signal applications) to 1000 cm$^2$ (for example for high power applications).

The operation of the device 1 of the invention is as follows.

When an alternating voltage is applied between the electrodes 2, 2A, a current starts to flow, bridging the dielectric layers 3, 3A as a capacitive (displacement) current and the conductive fluid filled cavity 5 as a resistive (ion) current.

If the conductivity of the conductive fluid is greater than 1.0 mho/meter, the resistance of the cavity 5 is low and can be neglected in comparison with the other impedances involved.

Measurements have shown that at 10 kHz the capacitive part of the current through the dielectric layers 3, 3A is several orders of magnitude above the resistive part (i.e., the part related to leakage through the oxide layer).

Thus, the connector 1 is a "capacitive connector".

It will be appreciated that the electrodes 2, 2A may have any size and shape suitable for the purpose.

By increasing the size of the electrodes 2, 2A the power rating of a capacitive connector 1 can be increased to any value. However, a limitation will be posed by the losses in the associated subsea cabling particularly due to the skin effect.

Calculations have shown that power ratings of 5 kVA are feasible with acceptable increase in cable complexity.

This rating is comparable to the maximum power rating of currently available inductive couplers.

It should be well understood that the electrical connector apparatus may properly operate in a submerged environment, where the surrounding fluid has a conductivity greater than 1.0 mho/meter. The fluid may therefore comprise sea water or, for example, an aqueous drilling fluid having this conductivity.

Various modifications of the present invention will become apparent to those skilled in the art from the foregoing description and accompanying drawing. Such modifications are intended to fall within the scope of the appended claims.

I claim as my invention:

1. A capacitive electrical underwater connector apparatus, said connector apparatus comprising;
    a first member,
    a second member, each of said members including an electrode having a surface, each surface provideable with a dielectric layer, said electrodes electrically connectable to respective subsea installation parts to be capacitively coupled, said first and said second member mechanically mated to each other, said surface of said electrode of said first member located opposite and directed to said surface of said electrode of said second member, and
    means for ensuring that a cavity defined through the space that separates said electrodes fills with sea water when submerged.

2. The connector apparatus as claimed in claim 1, wherein the electrodes form plates.

3. The connector apparatus as claimed in claim 2, wherein the plates are provided with an oxide skin of Hastelloy-C.

4. The connector apparatus as claimed in claim 2, wherein the plates are provided with an oxide skin of Monel.

5. The connector apparatus as claimed in claim 2, wherein the plates are provided with an oxide skin of Inconel.

6. The connector apparatus as claimed in claim 2, wherein the plates are provided with an oxide skin of titanium.

7. The connector apparatus as claimed in claim 2, wherein the plates are made of a metal.

8. The connector apparatus as claimed in claim 2, wherein the plates have an area in the 1–1000 cm$^2$ range.

9. The connector apparatus as claimed in claim 1, wherein the dielectric layers have a thickness in the 0.3–10 nm range.

10. The connector apparatus as claimed in claim 1, wherein the first and second members are made of insulating material.

11. A capacitive electrical underwater connector apparatus, said connector apparatus comprising;
    a first member,
    a second member, each of said members including an electrode having a surface, each surface provideable with a dielectric layer, said electrodes electrically connectable to respective subsea installation parts to be capacitively coupled, said first and said second member mechanically mateable to each other, said surface of said electrode of said first member locatable opposite and directable to said surface of said electrode of said second member when said first member is mated to said second member, and
    means for ensuring that a cavity defined through the space that separates said electrodes, when said first member is mated to said second member, fills with sea water when submerged.

12. A capacitive electrical connector apparatus, said connector apparatus comprising:

a first member, a second member, each of said members including an electrode having a surface, each surface provideable with a dielectric layer, said electrodes electrically connectable to respective installation parts to be capacitively coupled, and means for ensuring that a cavity defined through the space that separates said electrodes fills with a conductive fluid when submerged in said fluid.

13. The apparatus of claim 12 wherein said electrodes are electrically connectable to respective subsea installation parts.

14. The apparatus of claim 12 wherein said first and said second member are mechanically mateable to each other.

15. The apparatus of claim 12 wherein said surface of said electrode of said first member is locatable opposite and directable to said surface of said electrode of said second member.

16. The apparatus of claim 12 wherein said cavity defined between said electrodes is fillable with sea water when submerged.

17. The apparatus of claim 12 wherein said conductive fluid has a conductivity greater than 1.0 mho/meter.

18. The apparatus of claim 17 wherein said conductive fluid comprises sea water.

19. The apparatus of claim 17 wherein said conductive fluid comprises an aqueous drilling fluid.

* * * * *